(12) United States Patent
An

(10) Patent No.: US 11,517,054 B2
(45) Date of Patent: Dec. 6, 2022

(54) AEROSOL GENERATING DEVICE

(71) Applicant: KT&G CORPORATION, Daejeon (KR)

(72) Inventor: Hwi Kyeong An, Seoul (KR)

(73) Assignee: KT&G CORPORATION, Daejeon (KR)

(*) Notice: Subject to any disclaimer, the term of this patent is extended or adjusted under 35 U.S.C. 154(b) by 64 days.

(21) Appl. No.: 16/759,096

(22) PCT Filed: Jan. 25, 2019

(86) PCT No.: PCT/KR2019/001050
§ 371 (c)(1),
(2) Date: Apr. 24, 2020

(87) PCT Pub. No.: WO2019/216521
PCT Pub. Date: Nov. 14, 2019

(65) Prior Publication Data
US 2021/0161217 A1  Jun. 3, 2021

(30) Foreign Application Priority Data

May 8, 2018 (KR) .................. 10-2018-0052788

(51) Int. Cl.
| | | |
|---|---|---|
| *A24F 13/00* | (2006.01) | |
| *A24F 40/95* | (2020.01) | |
| *A24F 40/40* | (2020.01) | |
| *A24F 40/20* | (2020.01) | |
| *H02J 7/00* | (2006.01) | |

(52) U.S. Cl.
CPC .............. *A24F 40/95* (2020.01); *A24F 40/40* (2020.01); *A24F 40/20* (2020.01); *H02J 7/0063* (2013.01)

(58) Field of Classification Search
CPC ....................................................... A24F 47/00

USPC .................................................. 131/328–329
See application file for complete search history.

(56) References Cited

U.S. PATENT DOCUMENTS

| | | | | |
|---|---|---|---|---|
| 3,671,920 A | * | 6/1972 | Iantorno | .................. H01R 9/16 |
| | | | | 439/550 |
| 9,402,422 B2 | * | 8/2016 | Shenkal | .................. H05B 3/40 |
| 9,572,373 B2 | * | 2/2017 | Chen | ....................... A24F 40/42 |
| 9,603,388 B2 | | 3/2017 | Fernando et al. | |
| 9,883,700 B2 | | 2/2018 | Holzherr et al. | |
| 10,111,470 B2 | * | 10/2018 | Monsees | .................. H05B 3/04 |
| 10,398,172 B2 | | 9/2019 | Batista | |

(Continued)

FOREIGN PATENT DOCUMENTS

| | | |
|---|---|---|
| CN | 203607468 U | 5/2014 |
| CN | 104799437 A | 7/2015 |

(Continued)

OTHER PUBLICATIONS

Communication dated Apr. 27, 2021, from the Japanese Patent Office in application No. 2020-526947.

(Continued)

*Primary Examiner* — Phuong K Dinh

(74) *Attorney, Agent, or Firm* — Sughrue Mion, PLLC

(57) ABSTRACT

An aerosol generation device may include a case: a carrier coupled to the case; and a plurality of terminals coupled to the carrier and including one end in contact with a power source external to the case and the other end extending and protruding from the one end to an inside of the case.

4 Claims, 6 Drawing Sheets

(56) References Cited

U.S. PATENT DOCUMENTS

| | | |
|---|---|---|
| 2015/0020831 A1 | 1/2015 | Weigensberg et al. |
| 2015/0208729 A1 | 7/2015 | Monsees et al. |
| 2017/0333650 A1 | 11/2017 | Buchberger et al. |
| 2019/0364972 A1 | 12/2019 | Lin et al. |

FOREIGN PATENT DOCUMENTS

| | | |
|---|---|---|
| CN | 106255430 A | 12/2016 |
| CN | 106572708 A | 4/2017 |
| CN | 106820269 A | 6/2017 |
| JP | 3215509 B2 | 10/2001 |
| JP | 2005259690 A | 9/2005 |
| JP | 2015500647 A | 1/2015 |
| JP | 3201775 U | 12/2015 |
| KR | 10-2014-0002639 A | 1/2014 |
| KR | 10-2014-0114554 A | 9/2014 |
| KR | 10-2014-0119029 A | 10/2014 |
| KR | 10-2016-0088162 A | 7/2016 |
| KR | 10-2016-0129015 A | 11/2016 |
| KR | 10-2017-0081220 A | 7/2017 |
| WO | 2013093695 A1 | 6/2013 |

OTHER PUBLICATIONS

Office Action for Corresponding KR 10-2018-0052788, dated Apr. 29, 2019.
Office Action for Corresponding KR 10-2018-0052788, dated Nov. 25, 2019.
International Search Report for PCT/KR2019/001050, dated May 10, 2019.
Extended European Search Report dated Jan. 5, 2022, issued by the European Patent Office in application No. 19800491.3.
Office Action dated Jul. 27, 2022 issued by the Chinese Patent Office in Chinese Application No. 201980005356.5.

* cited by examiner

AEROSOL GENERATING DEVICE

CROSS-REFERENCE TO RELATED APPLICATIONS

This application is a National Stage of International Application No. PCT/KR2019/001050 filed on Jan. 25, 2019, claiming priority based on Korean Patent Application No. 10-2018-0052788 filed on May 8, 2018.

BACKGROUND

1. Field of the Invention

The present disclosure relates to an aerosol generation device, and more particularly, to an aerosol generation device which is stable and convenient to use.

2. Description of Related Art

Recently, the demand for alternative methods to overcome the shortcomings of general cigarettes has increased. For example, there is growing demand for a method of generating aerosol by heating an aerosol generating material in cigarettes, rather than by burning cigarettes. Accordingly, studies on a heating-type cigarette and a heating-type aerosol generating device have been actively conducted.

The aerosol generation device includes a liquid nicotine vaporizer for vaporizing a liquid cigarette or an aerosol generator for heating a cigarette to generate a smoking gas by using a fumigation method.

A battery is included in the aerosol generation device to supply power for use in such a heat type aerosol generation device. However, the size and weight of the battery are limited to maintain the portability of the heat type aerosol generation device. As such, under normal use, the battery generally only lasts around one to two days after being fully charged.

If the battery is discharged because the device is not fully charged in this way, the user cannot use the device, and thus, users must carry a portable power supply and a charging cable electrically connecting the portable power supply and the device to continuously charge the battery.

BRIEF SUMMARY OF THE INVENTION

In order to solve the inconvenience of charging via a cable, provided is an aerosol generation device that is chargeable through contact.

Charging through contact requires inserting a battery charging terminal structure into a case of the aerosol generation device. The inserted charging terminal structure may be electrically connected to an external power source and a battery inside the case. When the charging terminal is inserted from the outside, an impact may be applied to the exterior of the case. After the insertion, the charging terminal may be separated from the case due to an external load.

In order to maintain a stable electrical connection between a terminal of the charging terminal structure and a printed circuit board (PCB) connection portion on a PCB, a pressure equal to or greater than a predetermined level must be applied between the terminal and the PCB connection portion. The pressure is generated as the elastic PCB connection portion is compressed. In order for the pressure equal to or greater than the predetermined value to be generated, a compression distance must be greater than a specific distance 6.

A diameter the terminal of the charging terminal structure to be connected with the PCB connection portion may be increased, considering positional deviations that may occur when the PCB connection portion is formed on the PCB, assembly tolerances that may occur when assembling components, and component dimensional tolerances that may occur when each component is produced, as well as a compression distance equal to or more than the specific distance. However, the size of the diameter of the terminal that can be exposed to the outside of the case is limited.

In order to satisfy the above requirements, the diameter of one end of the terminal exposed to the inside of the case and in contact with the PCB connection portion must be greater than the diameter of the other end of the terminal exposed to the outside of the case in the terminal. In this case, because it is difficult to insert the terminal from the outside of the case, the terminal needs to be inserted and positioned from the inside of the case.

The embodiments described below relate to the invention that enables the insertion of a terminal into the inside of an integral type case, and prevents defective connection that may occur due to the aforementioned deviation values, positional deviations, assembly tolerances and dimensional tolerances.

An aerosol generation device may include a case: a carrier coupled to the case; and a plurality of terminals coupled to the carrier and including one end in contact with an external power source external to the case and another end extending from the one end to an inside of the case.

The carrier may include an accommodation portion coupled to the terminal, and the terminal may be coupled to the accommodation portion by press fitting or insert injection.

The terminals may further include a support portion protruding outwardly between the one end and the other end. A diameter of the support portion may be greater than a diameter of the one end and a diameter of the other end, and the accommodation portion may include a stepped portion supporting the support portion.

The carrier may include a base portion at one end of the carrier, and the case may include a nut portion on an inner wall and a screw coupling the base portion and the nut portion.

The number of the base portion and the number of the nut portion coupled to the base portion may be plural.

The case may further include a rib protruding from the inner wall such that the other end of the carrier may be supported by the rib.

The case may include a PCB including a connection portion therein, and the other end of the plurality of terminals may be in contact with the connection portion to electrically connect the external power source and the PCB.

The case may further include a battery therein, and the battery may be electrically connected to the PCB such that the battery is chargeable by the external power source.

The connection portion may be elastic, and a pressure equal to or more than a predetermined level may be applied between the other end and the connection portion toward each other.

According to the embodiments described above, when a charging terminal is coupled to a case through a carrier, it is not necessary to insert the charging terminal through the inside of a mold structure such as an integral type case, thereby solving manufacturing difficulties. In addition, it is possible to prevent the impacts to the case, which may be generated when the insertion occurs from the outside of the charging terminal, and prevent the terminal from being separated from the case due to a load applied to the terminal.

DETAILED DESCRIPTION OF THE INVENTION

An aerosol generation device may include a case: a carrier coupled to the case; and a plurality of terminals coupled to the carrier and including one end in contact with an external power source external to the case and the other end extending and protruding from the one end to inside of the case.

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
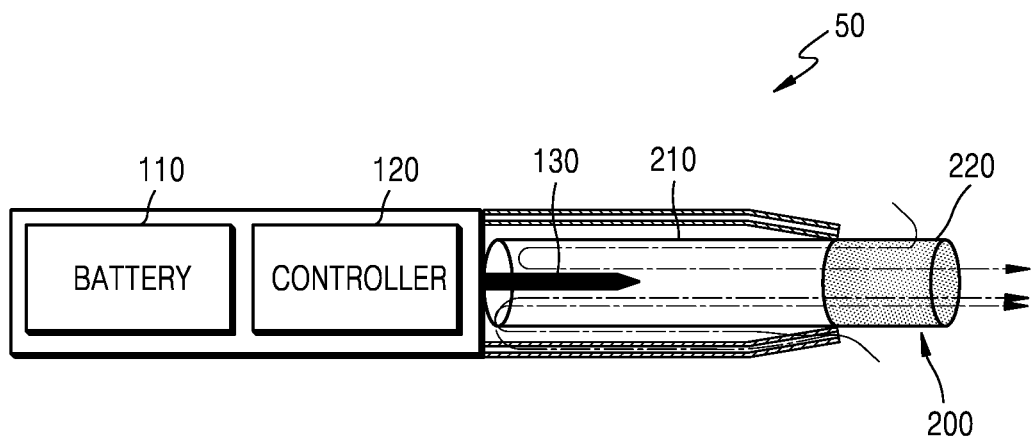
FIG. 1 is a diagram illustrating an embodiment in which a cigarette is inserted into an aerosol generation device.

FIG. 1 is a diagram illustrating an example in which a cigarette is inserted into an aerosol generating device.

Referring to FIG. 1, the aerosol generating device 50 may include a battery 110, a controller 120, and a heater 130. Also, the cigarette 200 may be inserted into an inner space of the aerosol generating device 50.

It will be understood by one of ordinary skill in the art related to the present embodiment that other general-purpose components may be further included in the aerosol generating device 50, in addition to the components illustrated in FIG. 1.

FIG. 1 illustrates that the battery 110, the controller 120, and the heater 130 are arranged in series, but the arrangement of these are not limited thereto. In other words, according to the design of the aerosol generating device 50, the arrangement of the battery 110, the controller 120, and the heater 130 may be modified.

When the cigarette 200 is inserted into the aerosol generating device 50, the aerosol generating device 50 heats the heater 130. The temperature of an aerosol generating material in the cigarette 200 is raised by the heated heater 130, and thus aerosol is generated. The generated aerosol is delivered to a user through a filter 220 of the cigarette 200.

As necessary, even when the cigarette 200 is not inserted into the aerosol generating device 50, the aerosol generating device 50 may heat the heater 130.

The battery 110 may supply power to be used for the aerosol generating device 50 to operate. For example, the battery 110 may supply power for heating the heater 130 and supply power for operating the control unit 120. Also, the battery 110 may supply power for operations of a display, a sensor, a motor, etc. mounted in the aerosol generating device 50.

The controller 120 may generally control operations of the aerosol generating device 50. In detail, the controller 120 controls not only operations of the battery 110 and the heater, but also operations of other components included in the aerosol generating device 50. Also, the controller 120 may check a state of each of the components of the aerosol generating device 50 to determine whether or not the aerosol generating device 50 is able to operate.

The controller 120 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 130 is heated by power supplied from the battery 110. For example, when the cigarette 200 is inserted into the aerosol generating device 50, the heater 130 may be located inside the cigarette 200. Thus, the heated heater 130 may increase a temperature of an aerosol generating material in the cigarette 200.

The heater 130 may include an electro-resistive heater. For example, the heater 130 may include an electrically conductive track, and the heater 130 may be heated when currents flow through the electrically conductive track. However, the heater 130 is not limited to the example described above and may be implemented using any other heaters capable of being heated to a desired temperature. Here, the desired temperature may be pre-set in the aerosol generating device 50 or may be set by a user.

As another example, the heater 130 may include an induction heater. In detail, the heater 130 may include an electrically conductive coil for heating a cigarette by an induction heating method, and the cigarette may include a susceptor which may be heated by the induction heater.

FIG. 1 illustrates that the heater 130 is inserted into the cigarette 200, but the position of the heater 130 is not limited thereto. For example, the heater 130 may include a tube-type heating element, a plate-type heating element, a needle-type heating element, or a rod-type heating element, and may heat the inside or the outside of the cigarette 200, according to the shape of the heating element.

Also, the aerosol generating device 50 may include a plurality of heaters 130. Here, the plurality of heaters 130 may be inserted into the cigarette 200 or may be arranged outside the cigarette 200. Also, some of the plurality of heaters 130 may be inserted into the cigarette 200, and the others may be arranged outside the cigarette 200. In addition, the shape of the heater 130 is not limited to the shape illustrated in FIG. 1, and may include various shapes.

The aerosol generating device 50 may further include general-purpose components in addition to the battery 110, the controller 120, and the heater 130. For example, the aerosol generating device 50 may include a display capable of outputting visual information and/or a motor for outputting haptic information. Also, the aerosol generating device 50 may include at least one sensor (a puff detecting sensor, a temperature detecting sensor, a cigarette insertion detecting sensor, etc.).

Also, the aerosol generating device 50 may be formed to have a structure that allows external air to be introduced or internal air to be discharged even while the cigarette 200 is inserted into the aerosol generating device 50.

Although not illustrated in FIG. 1, the aerosol generating device 50 and an additional cradle 70 may form together a system. For example, the cradle 70 may be used to charge the battery 110 of the aerosol generating device 50. The heater 130 may be heated when the cradle 70 and the aerosol generating device 50 are coupled to each other.

The cigarette 200 may be similar to a general combustive cigarette. For example, the cigarette 200 may be divided into a first portion 210 including an aerosol generating material and a second portion 220 including a filter or the like. Alternatively, the second portion 220 of the cigarette 200 may also include an aerosol generating material. For example, an aerosol generating material made in the form of granules or capsules may be inserted into the second portion 220.

The first portion 210 may be completely inserted into the aerosol generating device 50, and the second portion 220 may be exposed to the outside. In an embodiment, only a portion of the first portion 210 may be inserted into the aerosol generating device 50. In another embodiment, a portion of the first portion 210 and a portion of the second portion 220 may be inserted into the aerosol generating device 50. The user may puff aerosol while holding the second portion 220 by the mouth of the user. In this case, the aerosol is generated by the external air passing through the first portion 210, and the generated aerosol passes through the second portion 220 and is delivered to the user's mouth.

For example, the external air may flow into at least one air passage formed in the aerosol generating device 50. For example, opening and closing of the air passage and/or a size of the air passage may be adjusted by the user. Accordingly, the amount and smoothness of smoke may be adjusted by the user. As another example, the external air may flow into the cigarette 200 through at least one hole formed in a surface of the cigarette 200.

Hereinafter, an example of the cigarette 200 will be described with reference to FIG. 2.

Figure 2:
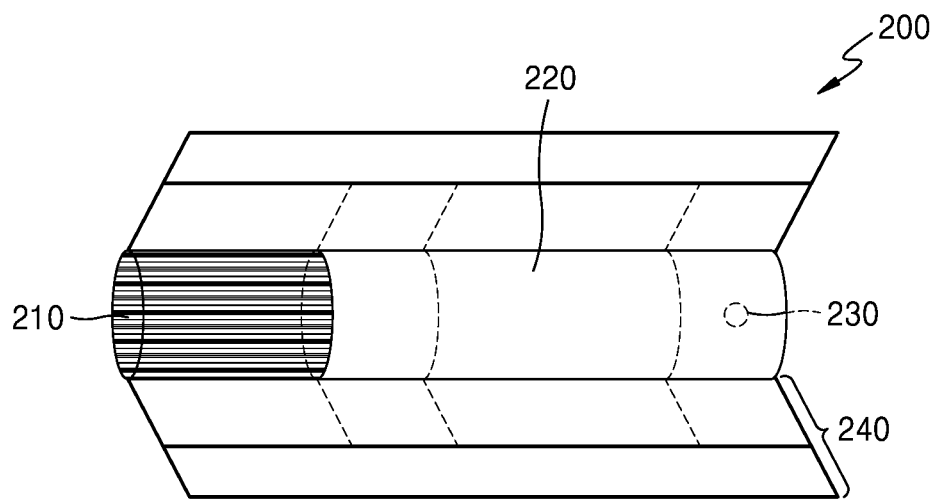
FIG. 2 shows a view showing an example of the cigarette 2000.

FIG. 2 shows a view showing an example of a cigarette.

Referring to FIG. 2, the cigarette 200 includes a tobacco rod 210 and a filter rod 220. The first portion 210 described above with reference to FIG. 1 includes the tobacco rod 210, and the second portion 220 includes the filter rod 220.

The filter rod 220 illustrated in FIG. 2 is illustrated as a single segment, but is not limited thereto. In other words, the filter rod 220 may include a plurality of segments. For example, the filter rod 220 may include a first segment configured to cool aerosol and a second segment configured to filter a certain component included in the aerosol. Also, as necessary, the filter rod 220 may further include at least one segment configured to perform other functions.

The cigarette 2000 may be packaged using at least one wrapper 240. The wrapper 240 may have at least one hole through which external air may be introduced or internal air may be discharged. For example, the cigarette 200 may be packaged using one wrapper 240. As another example, the cigarette 200 may be doubly packaged using at least two wrappers 240. For example, the tobacco rod 210 may be packaged using a first wrapper, and the filter rod 220 may be packaged using a second wrapper. Also, the tobacco rod 210 and the filter rod 220, which are respectively packaged using separate wrappers, may be coupled to each other, and the entire cigarette 200 may be packaged using a third wrapper. When each of the tobacco rod 210 and the filter rod 220 includes a plurality of segments, each segment may be packaged using a separate wrapper. Also, the entire cigarette 200 including the plurality of segments, which are respectively packaged using the separate wrappers and which are coupled to each other, may be re-packaged using another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat transmitted to the tobacco rod 210, and thus, the heat conductivity applied to the tobacco rod may be increased and taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and any other cooling segment that is capable of cooling the aerosol may be used.

Figure 3A:
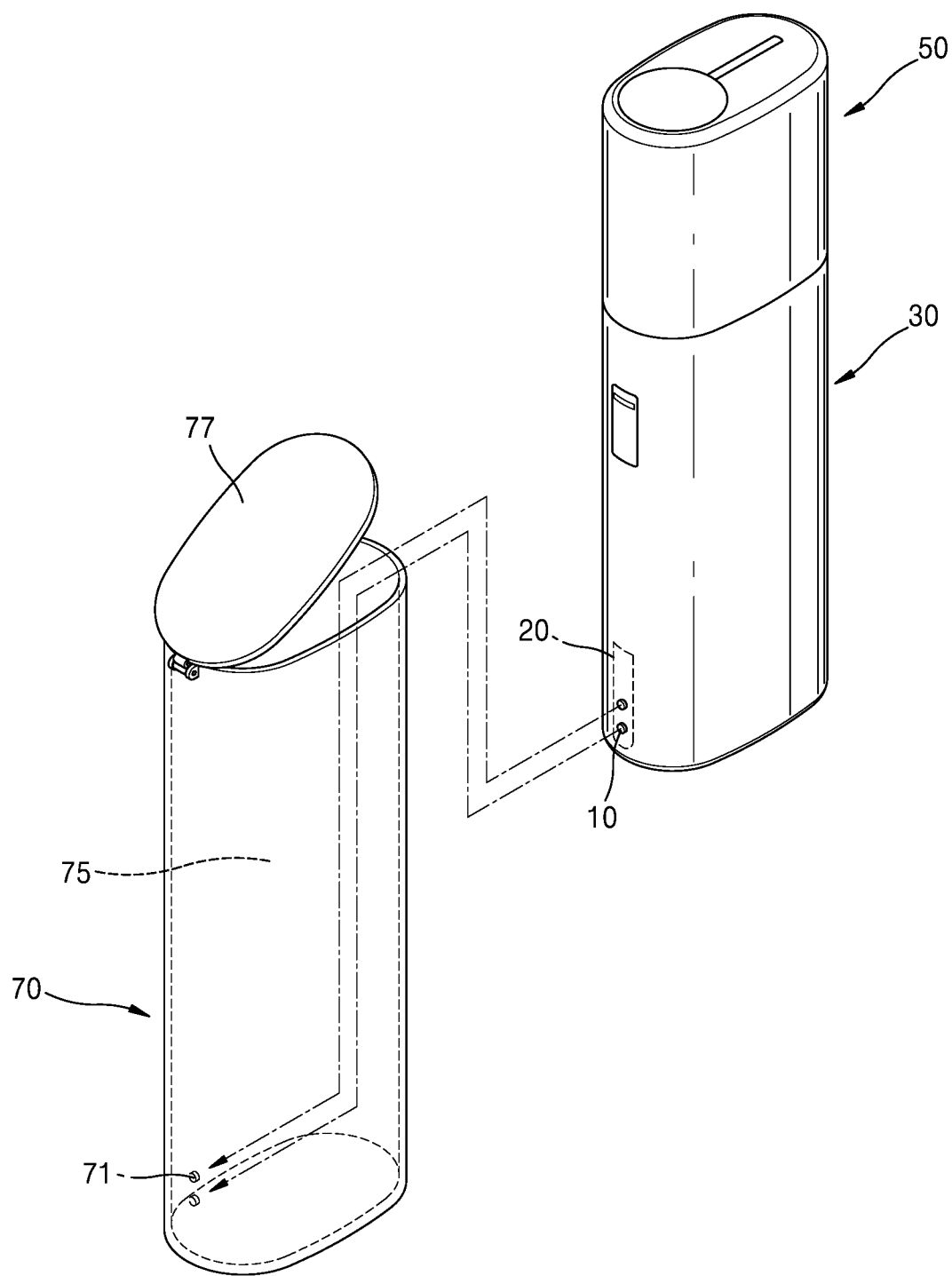
FIG. 3A is a perspective view illustrating an example of an aerosol generation device and a closed type external power source in contact with a terminal of the aerosol generation device and capable of charging the aerosol generation device, according to embodiments.

FIG. 3A is a perspective view illustrating an example of an aerosol generation device 50 and a closed type external power source in contact with a terminal 10 of the aerosol generation device 50 and capable of charging the aerosol generation device 50, according to an embodiment.

The aerosol generation device 50 receives and heats a cigarette to generate aerosol that is to be inhaled by a user. Here, a case 30, a carrier 20 coupled to the case 30, and a plurality of terminals 10 coupled to the carrier 20, from among many components of the aerosol generation device 50, are shown.

The aerosol generation device 50 includes the terminal 10 and the carrier 20 coupled to the terminal 10, on the case 30 of the aerosol generation device 50. The carrier 20 is manufactured as a separate component from the case 30 of the aerosol generation device 50 through a separate manufacturing process.

FIG. 3A also shows a cradle 70 coupled to the aerosol generation device 50 and capable of charging the aerosol generation device 50 as an embodiment of the closed type external power source.

The cradle 70 may have, for example, a cavity 75 into which the aerosol generation device 50 may be inserted. The cradle 70 may further include a lid 77 that prevents entry of an external material after the aerosol generation device 50 is inserted into the cavity 75.

The cradle 70 includes a contact portion 71 in the cavity 75 that may be in contact with the terminal 10 of the aerosol generation device 50. The contact portion 71 is formed at a position facing the plurality of terminals 10 of the aerosol generation device 50 inserted in the cavity 75. The cradle 70 may include a power supply that may supply power to the aerosol generation device 50.

When the aerosol generation device 50 is inserted into the cradle 70, the aerosol generation device 50 slides into the cavity 75 of the cradle 70, and the terminal 10 of the aerosol generation device 50 and the contact portion 71 of the cradle 70 come into contact with each other and are electrically connected. Electrical current may flow from the power supply of the cradle 70 to the aerosol generation device 50 through an electrical connection.

As an example, the cradle 70 may include the lid 77. After the aerosol generation device 50 is inserted into the cavity 75 of the cradle 70, the lid 77 may be closed. The aerosol generation device 50 in the cavity 75 of the cradle 70 is isolated from the outside by the lid 77.

The contact portion 71 in the cavity 75 of the cradle 70 may be plural so as to correspond to the number of the terminal 10 of the aerosol generation device 50 and may be in contact with and electrically connected to the terminal 10.

Because the terminal 10 and the contact portion 71 are electrically connected through contact, electrical current may flow from the cradle 70 into the aerosol generation device 50. The electrical current flowing into the aerosol generation device 50 may charge the battery 110 inside the aerosol generation device 50.

Figure 3B:
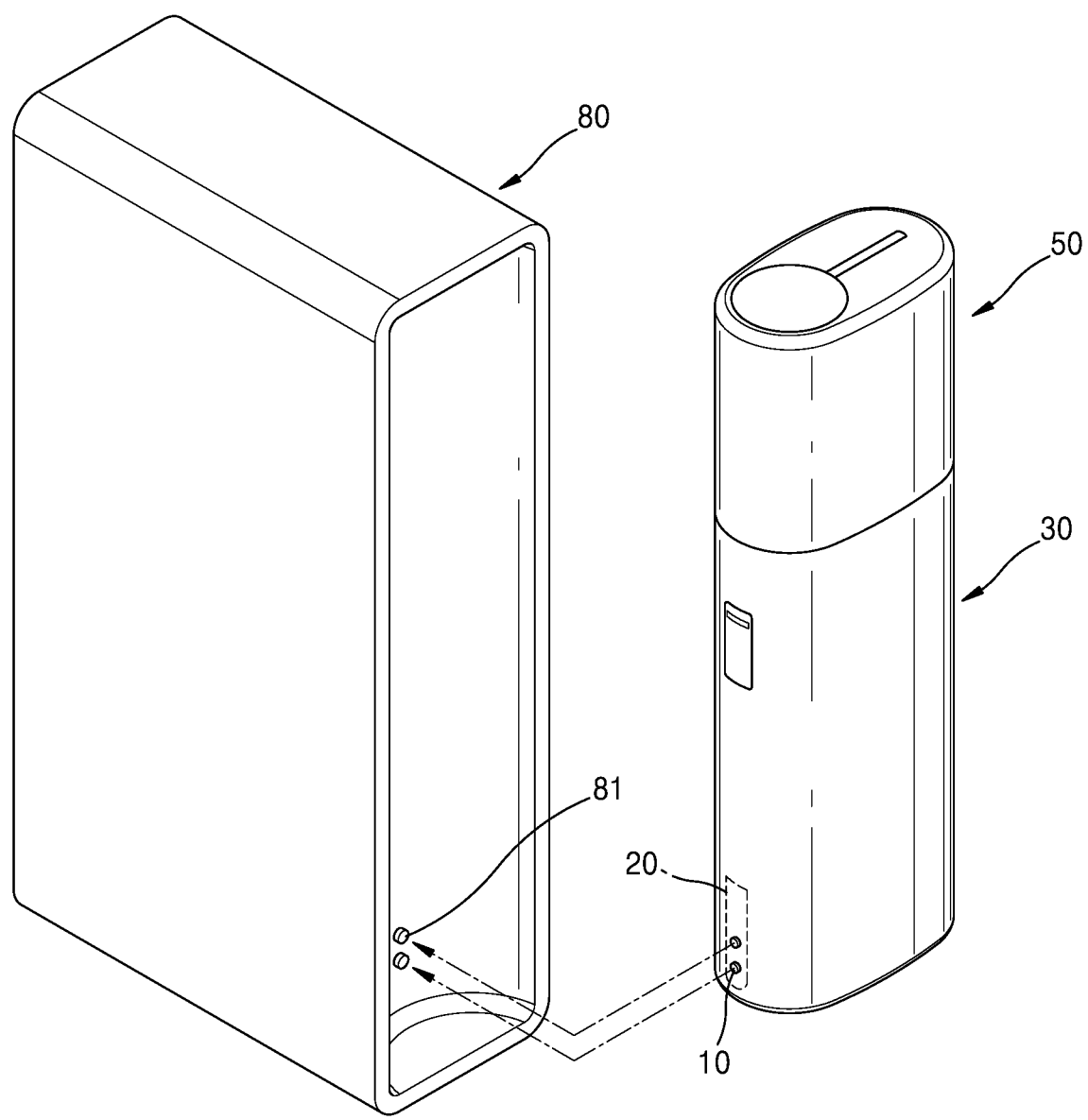
FIG. 3B is a perspective view illustrating an example of an aerosol generation device and an open type external power source in contact with a terminal of the aerosol generation device and capable of charging the aerosol generation device, according to embodiments.

FIG. 3B is a perspective view illustrating an example of an aerosol generation device 50 and an open type external power source in contact with a terminal 10 of the aerosol generation device 50 and capable of charging the aerosol generation device 50, according to an embodiment.

The aerosol generation device 50 shown in FIG. 3B is the same as the aerosol generation device 50 shown in FIG. 3A, and a description thereof will be omitted.

FIG. 3B shows an open type cradle 80 as another example of an external power source. In the case of the open type cradle 80, the open type cradle 80 may include a fixing device capable of fixing the aerosol generation device 50 when the aerosol generation device 50 is coupled to the open type cradle 80. The fixing device may fix the open type cradle 80 and the aerosol generation device 50 by using a fixing tool such as a magnet.

The open type cradle 80 includes a contact portion 81 to be in contact with the terminal 10 of the aerosol generation device 50 on a surface of the open type cradle 80. For coupling with the open type cradle 80, a surface of the aerosol generation device 50 may slide onto the surface of the open type cradle 80 including the contact portion 81.

When the terminal 10 of the aerosol generation device 50 and the contact portion 81 of the open type cradle 80 are in contact with each other, the terminal 10 and the contact portion 81 are electrically connected, and thus the electrical current may flow from the open type cradle 80 to the aerosol generation device 50.

The contact portion 81 may be plural so as to correspond to the number of the terminal 10 of the aerosol generation device 50 and may be in contact with and electrically connected to the terminal 10.

An electrical connection of the terminal 10 and the contact portion 81 may allow the electrical current to flow from the open type cradle 80 into the aerosol generation device 50, thereby charging the battery 110 inside the aerosol generation device 50.

Figure 4A:
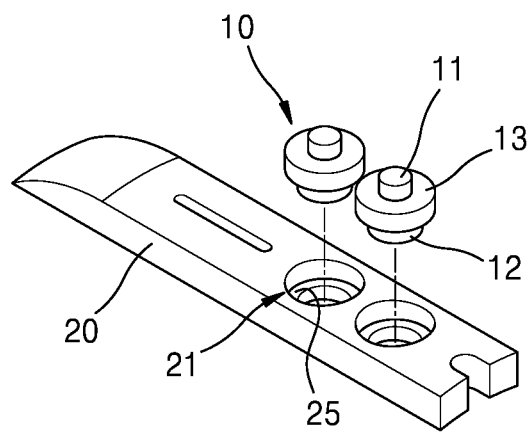
FIG. 4A is a perspective view illustrating a charging terminal structure applied to the aerosol generation device of the embodiments illustrated in FIGS. 3A and 3B.
Figure 4B:
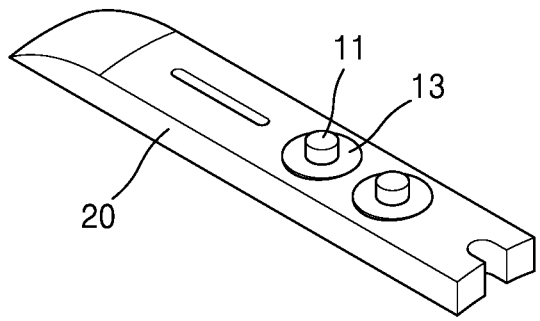
FIG. 4B is a perspective view illustrating a coupling relationship of the charging terminal structure of FIG. 4A.

FIG. 4A is a perspective view illustrating a charging terminal structure applied to the aerosol generation device 50 of the embodiments illustrated in FIGS. 3A and 3B, and FIG. 4B is a perspective view illustrating a coupling relationship of the charging terminal structure of FIG. 4A.

The charging terminal structure includes the terminal 10 and the carrier 20 coupled to the terminal 10. The charging terminal structure may include a plurality of terminals 10. The terminal 10 has one end 11 to be in contact with an external power source and the other end 12 extending and protruding in the opposite direction to the inside of the case 30.

The other end 12 of the terminal 10 may be exposed to the inside of the aerosol generation device 50 and the exposed portion may be in contact with a component in the aerosol generation device 50. Through such electrical contact, power of the external power source may be transferred to the component inside the aerosol generation device 50 through the terminal 10.

The terminal 10 may further include a support portion 13 protruding outwardly between the one end 11 and the other end 12. The support portion 13 may have a diameter greater than the diameter of one end 11 and the diameter of the other end 12.

The carrier 20 may further include an accommodation portion 21 coupled to the terminal 10. The accommodating portion 21 may be plural so as to correspond to the number of the terminal 10. The terminal 10 may be coupled to the accommodation portion 21 of the carrier 20 by press fitting. Alternatively, the terminal 10 may be coupled to the accommodation portion 21 by insert injection.

The accommodation portion 21 may include a stepped portion 25 which may support the support portion 13. When the support portion 13 is supported by the stepped portion 25, the stepped portion 25 may provide support force resisting external force acting on the terminal 10 toward the inside of the case 30. This support force prevents the terminal 10 from being inserted into the case 30 by the external force.

The terminal 10 may include a conductive material so as to be electrically connected to the external power source. For example, the terminal 10 may include a metal. The terminal 10 may include copper, nickel, silver, or a combination thereof. The one end 11 and the other end 12 of the terminal 10 may be plated with gold so as to minimize the resistance of the terminal 10 and increase conductivity, thereby preventing a contact failure due to corrosion.

Figure 5:
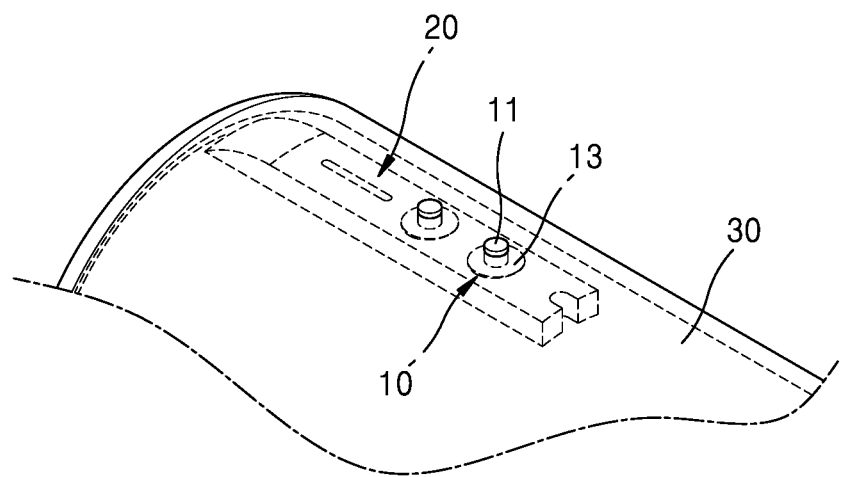
FIG. 5 is an enlarged perspective view of a part of an aerosol generation device to which a charging terminal structure according to the embodiments of FIGS. 4A and 4B is applied.

FIG. 5 is an enlarged perspective view of a part of the aerosol generation device 50 including a charging terminal structure according to the embodiments of FIGS. 4A and 4B.

The carrier 20 of the charging terminal structure may be coupled to a plurality of terminals 10. The carrier 20 combined with the terminal 10 may be coupled to the case 30 of the aerosol generation device 50 by insert injection. As such, the case 20 and the case 30 of the aerosol generation device 50 are integrated. When the carrier 20 and the case 30 are combined, the one end 11 of the terminal 10 faces the outside of the case 30 of the aerosol generation device 50 and the other end 12 of the terminal 10 faces the inside of the case 30. The other end 12 facing the inside of the case 30 extends and protrudes toward the inside of the case 30 from the carrier 20.

The one end 11 facing the outside of the case 30 may be in contact with the external power source, and the other end 12 facing the inside of the case 30 may be in contact with a component disposed inside the case 30. The component of the inside of the case 30 may be, for example, a PCB 65 or the battery 110.

Figure 6:
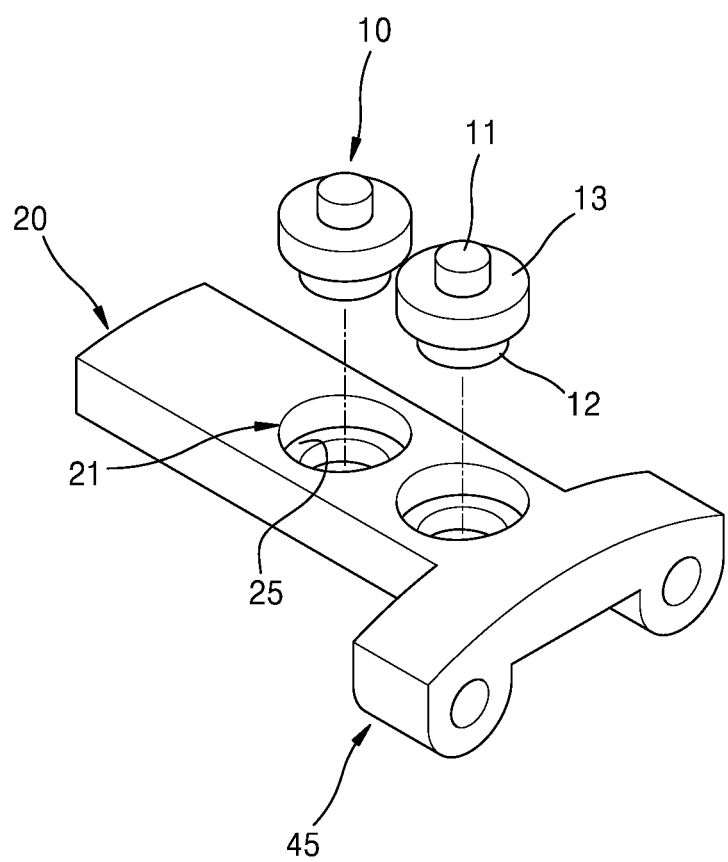
FIG. 6 is a perspective view illustrating a charging terminal structure according to embodiments.

FIG. 6 is a perspective view illustrating a charging terminal structure according to an embodiment.

The charging terminal structure includes the terminal 10 and the carrier 20 coupled to the terminal 10. The charging terminal structure may include a plurality of terminals 10. The terminal 10 has one end 11 to be in contact with an external power source of the case 30 and the other end 12 extending and protruding from the one end 11 toward the inside of the case 30.

The other end 12 of the terminal 10 may be exposed to the inside of the aerosol generation device 50 and the exposed portion may be in contact with a component disposed inside the aerosol generation device 50. Through such electrical contact, power of the external power source may be transferred through the terminal 10.

The terminal 10 may further include a support portion 13 protruding outwardly between the one end 11 and the other end 12. The support portion 13 may have a diameter larger than the diameter of one end 11 and the diameter of the other end 12.

The carrier 20 may further include a base portion 45 at one end of the carrier 20. The base portion 45 has a fastening structure that allows a screw to be inserted. The fastening structure may be, for example, a screw thread. The number of the base portion 45 may be one or more.

The carrier 20 may further include an accommodation portion 21 coupled to the terminal 10. The accommodating portion 21 may be plural so as to correspond to the number of the terminal 10. The terminal 10 may be coupled to the accommodation portion 21 of the carrier 20 by press fitting. Alternatively, the terminal 10 may be coupled to the accommodation portion 21 by insert injection.

The accommodation portion 21 may include the stepped portion 25 which may support the support portion 13. When the support portion 13 is supported by the stepped portion 25, the stepped portion 25 may provide support force resisting external force acting on the terminal 10 toward the inside of the case 30. This support force prevents the terminal 10 from being inserted into the case 30 by the external force.

The terminal 10 may include a conductive material so as to be electrically connected to the external power source. For example, the terminal 10 may include a metal. The terminal 10 may include copper, nickel, silver, or a combination thereof. The one end 11 and the other end 12 of the terminal 10 may be plated with gold so as to minimize the resistance of the terminal 10 and increase conductivity, thereby preventing a contact failure due to corrosion.

Figure 7:
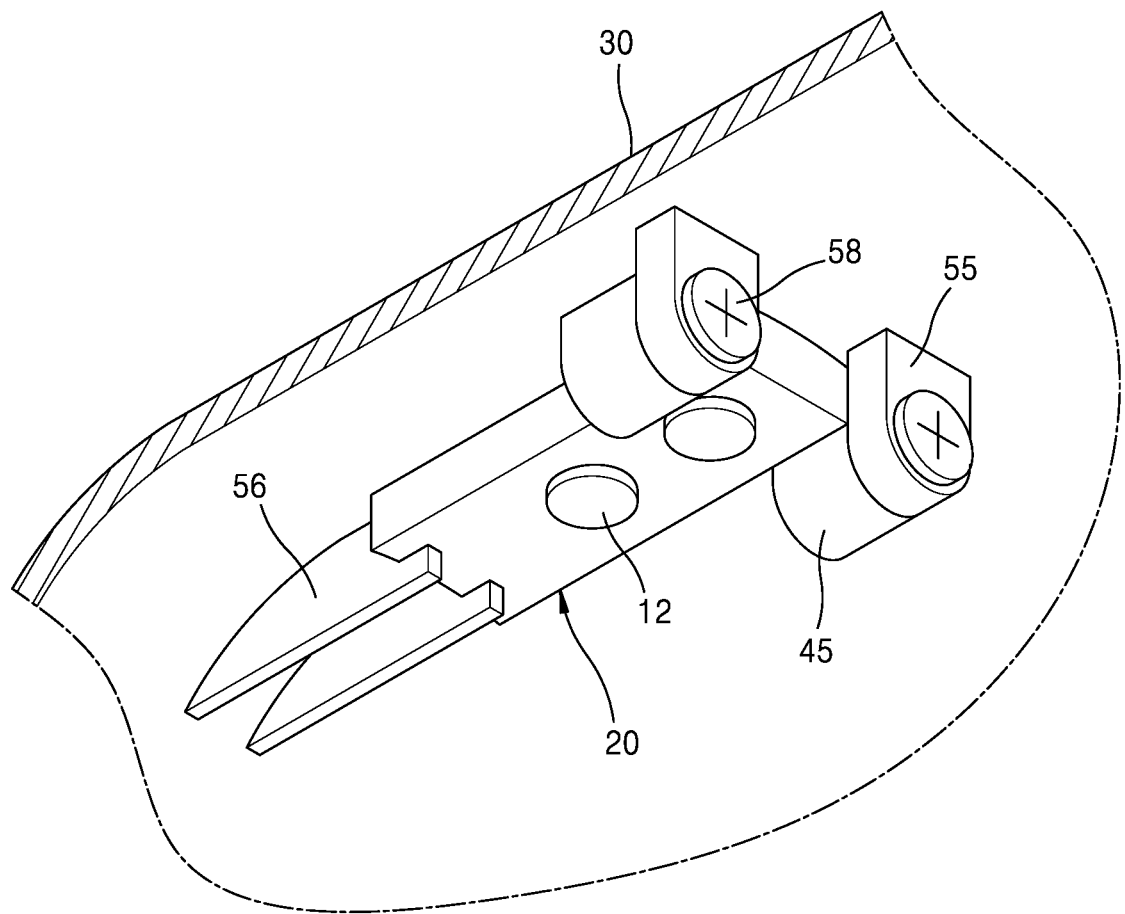
FIG. 7 is an enlarged perspective view of a part of an aerosol generation device on which the charging terminal structure of FIG. 6 is mounted.

FIG. 7 is an enlarged perspective view of a part of the aerosol generation device 50 including the charging terminal structure of FIG. 6.

The carrier 20 of the charging terminal structure may be combined with a plurality of terminals 10. The case 30 further includes a nut portion 55 protruding from the inner wall of the case 30. The case 30 may include one or more nut portions 55 so as to correspond to the number of the base portion 45.

The base portion 45 at one end of the carrier 20 and the nut portion 55 of the inner wall of the case 30 are coupled by a screw 58. The screw 58 may pass through the nut portion 55 of the inner wall of the case 30 and may be inserted into the base portion 45 of the carrier 20. The inserted screw 58 is engaged with a screw thread of the nut portion 55 and the base portion 45 such that the carrier 20 may be fixed on the inner wall of the case 30.

The case 30 may further include a rib 56 on an inner wall to support the other end of the carrier 20. One end of the carrier 20 may be coupled to the nut portion 55 of the case 30, and the other end of the carrier 20 may be supported by the rib 56.

The carrier 20 may be coupled to the inner wall of the case 30 by the nut portion 55 and the rib 56 provided on the inner wall of the case 30. When the carrier 20 and the case 30 are coupled, the one end 11 of the terminal 10 faces the outside of the case 30 of the aerosol generation device 50 and the other end 12 of the terminal 10 faces the inside of the case 30. The one end 11 facing the outside of the case 30 extends and protrudes to the outside of the case 30 through the carrier 20.

The one end 11 facing the outside of the case 30 may be in contact with the external power source, and the other end 12 facing the inside of the case 30 may be in contact with a component disposed inside the case 30.

Figure 8:
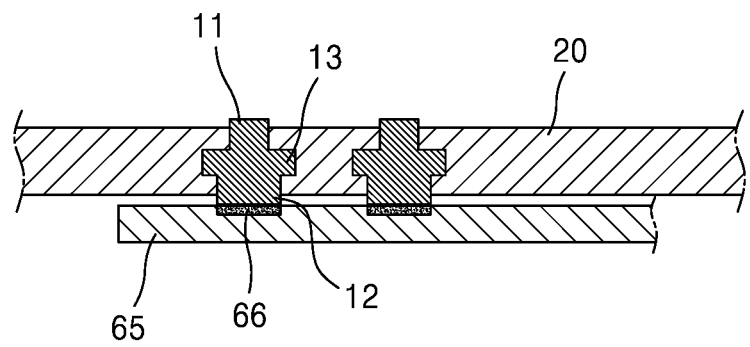
FIG. 8 is a lateral cross-sectional view of an aerosol generation device on which the charging terminal structure of FIG. 6 is mounted.

FIG. 8 is a lateral cross-sectional view of the aerosol generation device 50 including the charging terminal structure of FIG. 4B or FIG. 6.

The terminal 10 coupled to the carrier 20 has the one end 11 and the other end 12 extending and protruding in the opposite direction of the one end 11 toward the inside of the case 30.

The terminal 10 may further include a support portion 13 protruding outwardly between the one end 11 and the other end 12. The support portion 13 may have a diameter larger than the diameter of one end 11 and the diameter of the other end 12. The one end 11 of the terminal 10 faces the outside of the case 30 and the other end 12 of the terminal 10 faces the inside of the case 30.

The aerosol generation device 50 may include the PCB 65 and the battery 110. The other end 12 of the terminal 10 facing the inside of the case 30 of the aerosol generation device 50 may be in contact with and electrically connected to the PCB 65 included in the case 30.

As an elastic PCB connection portion 66 is compressed, a pressure is generated between the other end 12 of the terminal 10 and the PCB connection portion 66. In order to maintain a stable electrical connection between the other end 12 and the PCB connection portion 66, the pressure equal to or more than a predetermined level must be applied to each other. For the pressure to be equal to or more than the predetermined level, the elastic PCB connection portion 66 must be compressed by a distance greater than a specific distance 6.

The PCB 65 is electrically connected to the battery 110 inside the case 30. The PCB connection portion 66 in contact with the other end 12 of the terminal 10 may protrude toward the other end 12 of the terminal 10 so as to be in contact with the other end 12 of the terminal 10.

The one end 11 of the terminal 10 is in contact with an external power source while the other end 12 of the terminal 10 is in contact with the PCB 65 in the aerosol generation device 50, such that the electrical current may flow from the external power source to the PCB 65 through the terminal 10. Accordingly, the aerosol generation device 50 including the charging terminal structure may be charged through contact with the external power source.

According to the embodiments described above, the terminal 10 may be inserted into the case 30 having an integral type structure, through a separate component such as the carrier 20. In addition, support force opposing external force directed to the inside of the inserted terminal 10 is provided through a separate component. This support force may prevent the terminal 10 from being separated from the case 30 due to the external force.

According to the embodiments described above, the pressure equal to or greater than the predetermined level may be applied between the terminal 10 and the PCB connection portion 66 of the charging terminal structure such that the terminal 10 and the PCB connection portion 66 may maintain a stable electrical connection. In addition, it is possible to insert the terminal 10 into the inside of the integral type case 30 and to prevent a connection failure that may occur due to the aforementioned deviation values, positional deviations, assembly tolerances and dimensional tolerances.

In addition, the terminal 10 may be elastically supported through a separate component to allow an elastic contact with another component, thereby enabling the wireless charging of the aerosol generation device 50 through the electrical connection through the contact.

Those of ordinary skill in the art related to the present embodiments may understand that various changes in form and details can be made therein without departing from the scope of the characteristics described above. The disclosed methods should be considered in descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generation device comprising:
a case;
a carrier coupled to the case; and
a plurality of terminals coupled to the carrier, and comprising one end exposed out of the case and another end protruding to inside of the case, wherein
the carrier comprises a base portion at one end of the carrier, and
the case comprises a nut portion on an inner wall and a screw coupling the base portion and the nut portion.

2. The aerosol generation device of claim 1, wherein a number of the base portion and a number of the nut portion coupled to the base portion are plural.

3. The aerosol generation device of claim 1, wherein the case further comprises a rib protruding from the inner wall such that the another end of the carrier is supported by the rib.

4. An aerosol generation device comprising:
a case comprising a battery and a printed circuit board (PCB);
a carrier coupled to the case; and
a plurality of terminals coupled to the carrier, and comprising one end exposed out of the case and another end protruding to inside of the case, wherein
the PCB comprises a connection portion in contact with the another end of the terminals such that an external power source is electrically connectable to the PCB through the terminals and the connection portion,
the battery is electrically connected to the PCB such that the battery is chargeable by the external power source, and
the connection portion is elastic such that a pressure equal to or greater than a predetermined level is applied between the another end and the connection portion toward each other.

* * * * *